US008776657B2

(12) United States Patent
Menze

(10) Patent No.: US 8,776,657 B2
(45) Date of Patent: Jul. 15, 2014

(54) BLADE MOUNTING ASSEMBLY

(75) Inventor: Gregory A. Menze, Mount Prospect, IL (US)

(73) Assignee: Robert Bosch GmbH, Stuttgart (DE)

( * ) Notice: Subject to any disclaimer, the term of this patent is extended or adjusted under 35 U.S.C. 154(b) by 392 days.

(21) Appl. No.: 12/694,060

(22) Filed: Jan. 26, 2010

(65) Prior Publication Data

US 2011/0179931 A1 Jul. 28, 2011

(51) Int. Cl.
*B23D 45/16* (2006.01)

(52) U.S. Cl.
USPC ............ 83/666; 83/698.41; 30/388; 451/342; 411/7

(58) Field of Classification Search
USPC .............. 451/342, 340; 411/7, 408, 432, 919; 83/481, 665, 666, 698.41; 403/1; 30/388–391; 125/13.01
See application file for complete search history.

(56) References Cited

U.S. PATENT DOCUMENTS

| | | | | |
|---|---|---|---|---|
| 2,898,709 | A * | 8/1959 | Bednarski | 451/241 |
| 4,657,428 | A | 4/1987 | Wiley | |
| 4,971,498 | A | 11/1990 | Goforthe | |
| 5,085,550 | A | 2/1992 | Kendrick | |
| 5,545,078 | A * | 8/1996 | Schulz et al. | 451/342 |
| 5,662,444 | A | 9/1997 | Schmidt, Jr. | |
| 5,924,208 | A * | 7/1999 | Saeki | 30/388 |
| 6,295,910 | B1 | 10/2001 | Childs et al. | |
| 6,813,837 | B1 * | 11/2004 | Chen | 30/272.1 |
| 6,843,627 | B2 | 1/2005 | Childs et al. | |
| 7,013,987 | B2 * | 3/2006 | Nock et al. | 173/213 |
| 7,192,234 | B2 | 3/2007 | Anderson et al. | |
| 7,363,843 | B2 * | 4/2008 | Chiu | 83/571 |
| 2003/0084773 | A1 * | 5/2003 | Joo et al. | 83/666 |
| 2004/0043714 | A1 | 3/2004 | Yi | |

OTHER PUBLICATIONS

Wikipedia: Belleville Washer. Nov. 18, 2008. <http://en.wikipedia.org/wiki/Belleville_washer>.*

* cited by examiner

*Primary Examiner* — Andrea Wellington
*Assistant Examiner* — Brendan Ayer
(74) *Attorney, Agent, or Firm* — Maginot, Moore & Beck

(57) ABSTRACT

A blade mounting assembly for mounting a rotary blade to an arbor comprises an outer washer including a hub configured to extend through a bore of the blade, the hub defining a central bore sized to receive a spindle of the arbor. The hub further includes a locating surface arranged to contact the shoulder when the spindle extends through the central bore. The washer includes an engagement surface contacting the left side face of the blade when the hub extends through the bore of the blade. The engagement surface is disposed a fixed axial distance from the locating surface relative to the length of the hub. A fastener engages the outer washer to the arbor with the locating surface in contact with the shoulder. The assembly further includes a biasing element configured to be disposed over the hub between the shoulder and the right side face of the blade.

7 Claims, 3 Drawing Sheets

BLADE MOUNTING ASSEMBLY

BACKGROUND

The present disclosure relates to an assembly for mounting a rotating cutting blade to a driven arbor. The assembly has particular applicability to miter saws, table saws and circular saws incorporating a rotating blade.

A typical miter saw, such as the saw 10 shown in FIG. 1, includes a rotating blade 12 supported relative to a work table 14. In the case of the miter saw, the blade may be oriented at various multi-planar angles relative to a workpiece to be cut. The rotating blade is mounted to an arbor 16 (FIG. 2) that is rotated by an associated motor.

A typical blade mounting assembly, as depicted in FIG. 2, includes an inner washer 30 that is mounted on a spindle 18 of an arbor 16 of the rotary power source for the saw 10. The washer 30 thus includes a central bore 30*a* to receive the spindle. One face 32 of the inner washer bears against a shoulder 20 defined by the arbor at the base of the spindle. The opposite face 34 bears against the right face 13R of the blade 12, which also includes a bore 12*a* for mounting on the spindle.

An outer washer 40 is mounted at its central bore 40*a* on the spindle so that the inside face 42 bears against the opposite outside or left face 13L of the blade. (In accordance with standard terminology in the art, the right side of the blade faces the rotating spindle, while the left side faces away from the spindle). An arbor washer 50 with corresponding bore 50*a* is seated against the outside face 44 of the outer washer 40. The entire assembly is clamped together by a blade bolt 60 that threadedly engages a threaded bore 19 in the spindle. The head 62 is sized to bear against the arbor washer to thereby sandwich the rotating blade 12 between the inner and outer washers 30, 40.

With this mounting arrangement, the right face 13R of the blade is the locating face for the blade. In other words, the position of the right face 13R is always determinant regardless of the thickness of the blade 12, and is always in a fixed position or at a fixed axial distance relative to the shoulder 20 of the arbor 16. The position of the left face 13L is dependent upon the thickness of the blade. This thickness is variable due to manufacturing tolerances or the designed thickness of the blade. For many rotary saw applications, this variability of position of the left face of the cutting blade is not a significant concern. However, in certain applications, such as a miter saw, much of the cutting action of the blade occurs at the left or outer face, rather than at the right face, of the blade 12. In these applications the variability of the left face position leads to variability in the cut location, which, depending upon the degree of variability can result in an improper cut.

One problem with this left side variability arises when projecting a cut line on the workpiece. In many saws the cut line is projected at the left side of the blade to avoid visual conflict with the spindle and rotary power source. The cut line can typically be established for one predetermined blade thickness. If a thicker or thinner blade is used to make the cut, the left side cutting action of the blade will be axially offset from the desired cut line. The present disclosure provides a solution to this and other problems by establishing a fixed axial location for the left side of the blade.

SUMMARY

A blade mounting assembly is provided for mounting a rotary blade to an arbor, the arbor defining a shoulder and a spindle, and the rotary blade defining a bore therethrough and having a right side face facing the shoulder and a left side face facing away from the shoulder. The mounting assembly comprises an outer washer including an elongated hub configured to extend through the bore of the rotary blade. The hub defines a central bore sized to receive the spindle of the arbor extending therethrough and a locating surface arranged to contact the shoulder when the spindle extends through the central bore. The outer washer further includes an engagement surface arranged to contact the left side face of the blade when the hub extends through the bore of the rotary blade. In one aspect, the engagement surface is disposed a fixed axial distance from the locating surface relative to the length of the hub.

The assembly further comprises a fastener configured for fastening the outer washer to the arbor with the locating surface in contact with the shoulder, and a biasing element configured to be disposed over the hub. The biasing element is arranged between the shoulder and the right side face of the blade when the central hub extends through the bore of the rotary blade, and is operable to provide a biasing force against the right side face of the blade to clamp the blade against the engagement face of the blade.

In certain embodiments, the biasing element is a spring washer concentrically mounted over the hub. The spring washer may include an outer foot aligned with the engagement surface when the spring washer is concentrically mounted over the hub.

The engagement surface of the outer washer may extend radially from the hub. In certain embodiments, the engagement surface is an annular surface. In those embodiments, the biasing element may further include a foot at one end contacting the shoulder and a foot at an opposite end contacting the right side face of the blade, wherein the opposite foot is axially aligned with the annular engagement surface.

The present disclosure also contemplates an outer washer for mounting a rotary blade to an arbor, the rotary blade having a bore therethrough and the arbor including a shoulder and a spindle. The outer washer comprises an elongated hub configured to extend through the bore of the rotary blade, the hub defining a central bore sized to receive the spindle of the arbor extending therethrough. The hub further defines a locating surface arranged to contact the shoulder when the spindle extends through the central bore. The outer washer further comprises an engagement surface arranged to contact a side face of the blade when the hub extends through the bore of the rotary blade, the engagement surface disposed a fixed axial distance from the locating surface relative to the length of the hub. The engagement surface may extend radially from the hub and may be an annular surface.

DETAILED DESCRIPTION

Figure 1:
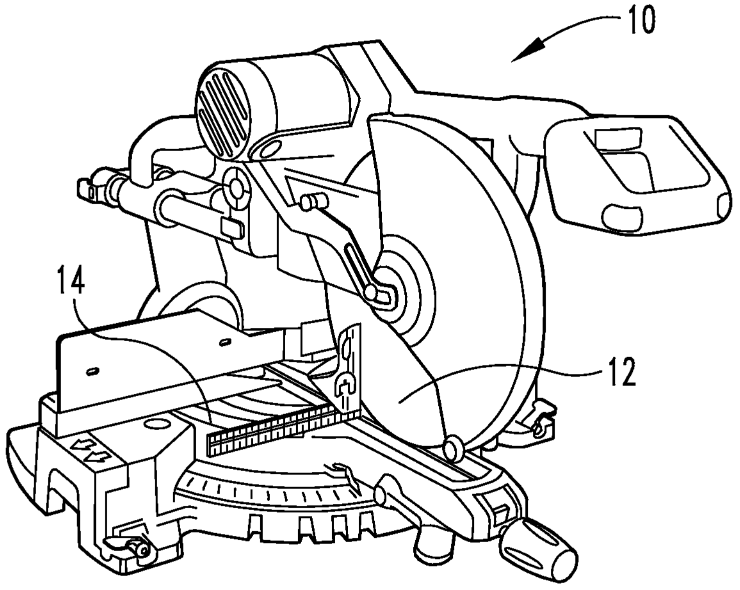
FIG. 1 is a pictorial representation of a typical miter saw that may incorporate the blade mounting assembly disclosed herein.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Figure 2:
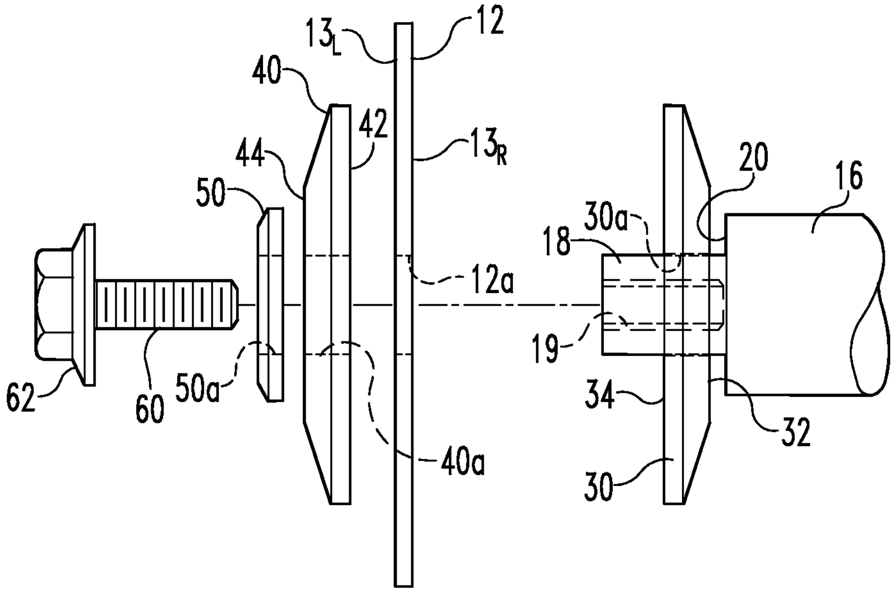
Fig. 2 (Prior Art)
FIG. 2 is an exploded view of a blade mounting assembly of the prior art.
Figure 3:
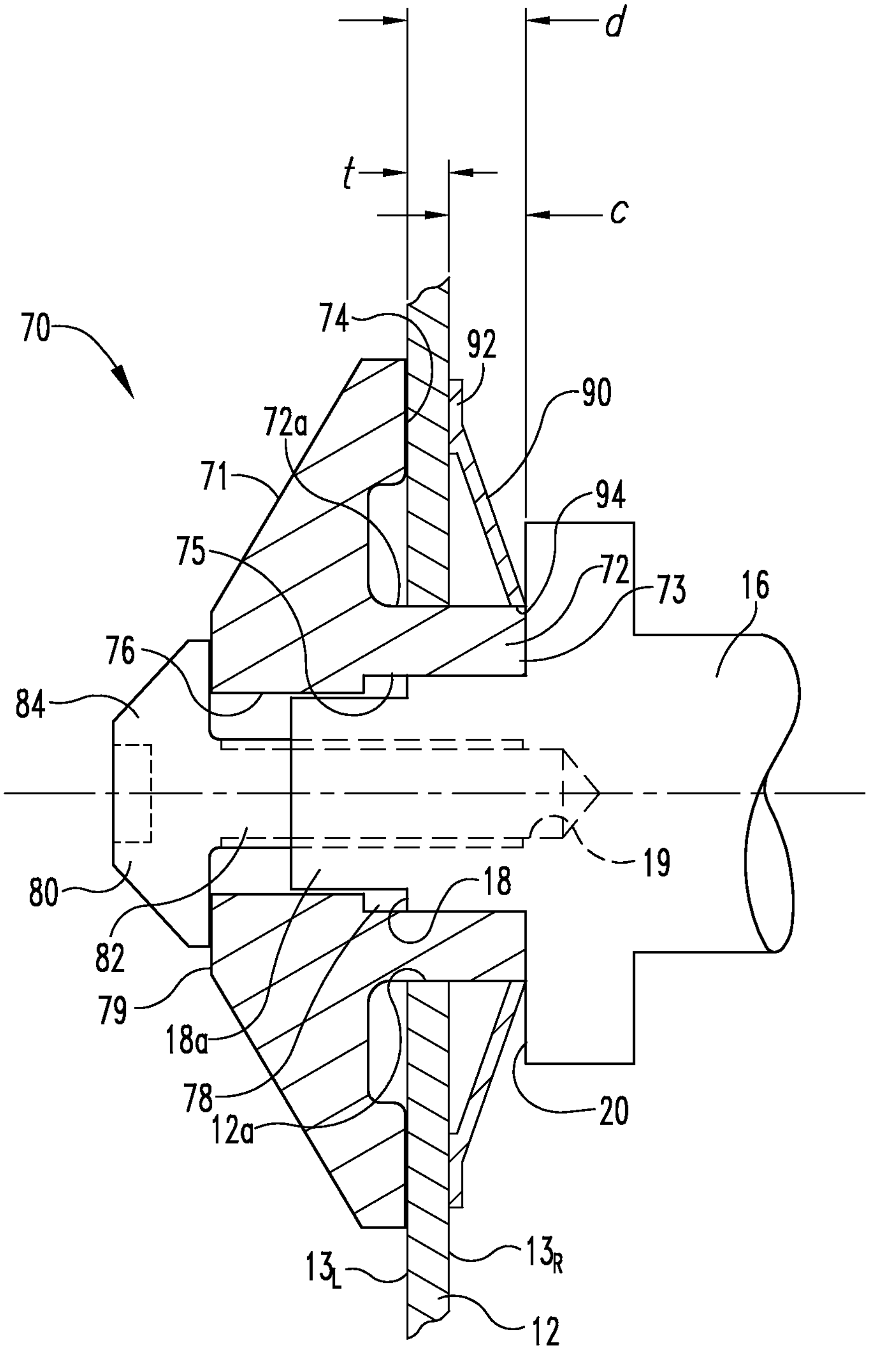
FIG. 3 is an enlarged cross-sectional view of a blade mounting assembly according to the present disclosure.

As illustrated in FIG. 3, a blade mounting assembly 70 includes an outside washer 71 that is configured to locate the outer or left side surface 13L of the blade 12. The outside washer 71 includes an elongated central hub 72 defining a bore 75 sized for a close sliding fit over the spindle 18 of the arbor. The central bore 12*a* in the blade 12 is modified from the bore shown in FIG. 2 to receive the central hub 72 in a close sliding fit. The hub 72 defines a locating surface 73 that bears against the shoulder 20 of the arbor. The washer further includes a blade engaging face 74 that may be in the form of a continuous or annular surface extending radially from the hub 72. The blade engaging face 74 is arranged a fixed axial distance d from the locating surface 73 so that the locating surface establishes or fixes the position of the blade engaging face 74 of the washer 71 relative to the arbor.

Figure 4A:
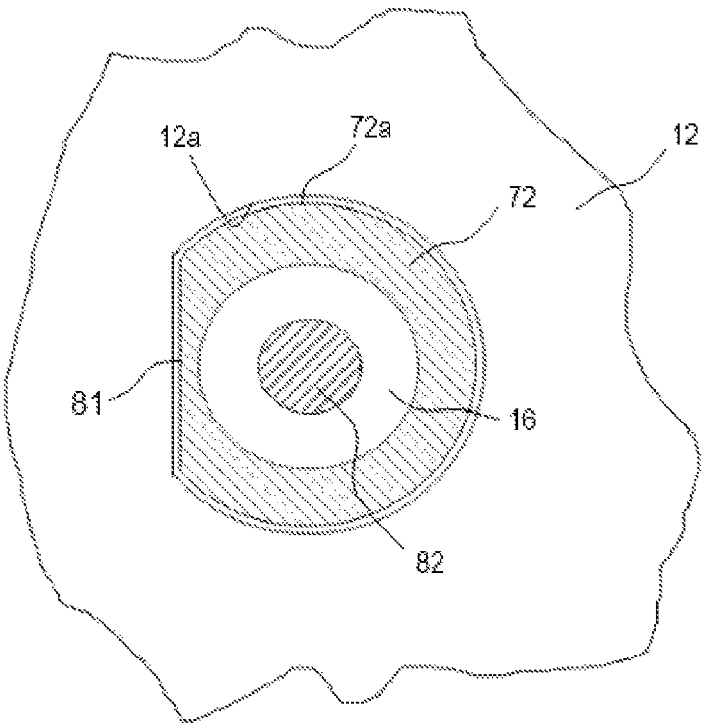
FIG. 4A depicts an embodiment of the outer surface of the washer having a keyed portion in the form of a flat.
Figure 4B:
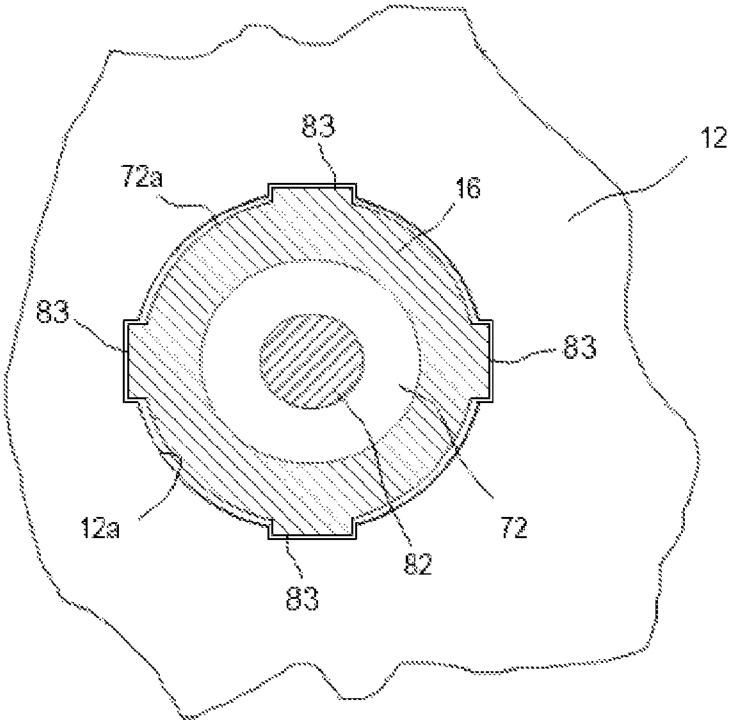
FIG. 4*b* depicts another embodiment of the outer surface of the washer having a keyed portion in the form of splines.

In one aspect, the bore 75 of the outside washer includes a keyed or interlocking portion 76 that coincides with a keyed or interlocking portion 18*a* of the spindle 18. The keyed spindle portion and the interlocking bore portion are offset to form an axial clearance 78 to ensure that the locating surface 73 of the hub is in flush contact with the shoulder 20. The keyed portions are configured to ensure that the components rotate together. Thus, the keyed portions 18*a*, 76 may incorporate one or more flats, or other interlocking surfaces. Likewise, the outer surface 72*a* of the washer 71 may incorporate one or more flats 73, such as depicted in FIG. 4A, splines 75, such as depicted in FIG. 4B, or other interlocking surfaces, with the bore 12*a* of the blade 12 being complementary configured.

The outside washer 71 is fastened or engaged to the spindle 18 by a fastener 80. In one embodiment, the fastener is a bolt having a threaded shank 82 adapted to engage the threaded bore 19 of the spindle. The head 84 of the fastener bears against the engagement face 79 of the outside washer to clamp the washer between the fastener 80 and the shoulder 20. In order to ensure that the locating surface 73 contacts the shoulder, the spindle 18 terminates within the bore 75 below the engagement surface 79.

As shown in FIG. 3, the blade 12 is disposed between the blade engagement face 74 of the outside washer 71 and the shoulder 20 of the spindle 16. In order to maintain the outside or left face 13L of the blade in solid contact with the engagement face 74, the blade mounting assembly 70 includes a biasing element 90 disposed between the inside or right face 13R of the blade and the shoulder 20. In one embodiment, the biasing element may be a Belleville spring washer concentrically mounted over the hub 72. The biasing element may include an outer circumferential foot 92 engaging the inside face 13R of the blade and an inner circumferential foot 94 engaging the shoulder 20 of the spindle. The inner foot may also contact the hub 72 of the washer to maintain the biasing element 90 concentrically aligned with the washer, blade and arbor. The outer foot 92 is aligned with the blade engagement face 74 of the outside washer 71, as illustrated in FIG. 3.

When the blade mounting assembly 70 is used to mount a blade 12 of the spindle 16, the locating surface 73 establishes the location of the blade engagement surface 74 at a fixed distance d from the shoulder 20. When the blade 20 abuts the engagement surface 74 the location of the outside or left side face 13L of the blade is thus established at the fixed distance d. The blade thickness t then establishes the compliance distance c between the inner or right side face 13R of the blade and the shoulder 20. The compliance c is thus directly related to the blade thickness, which means that the amount of compression or pressure experienced by the biasing element 90 is increased.

It can thus be appreciated that with the blade mounting assembly 70 disclosed herein, under all conditions and for all blade thickness, the position of the outside or left side 13L of the blade is fixed and repeatable. This characteristic allows the use of fixed position cut line techniques, such as the use of an optical or laser cutting line device, with assurance that the cut will be made exactly on the cut line.

In the embodiment shown in FIG. 3, the biasing element 90 is depicted as a Belleville spring washer. Other biasing elements are contemplated that are capable of providing sufficient clamping pressure against the blade 12 to prevent any axial movement of the blade 12 during a cutting operation. Thus, the biasing element 90 may be a mechanical component such as a wave washer, a leaf spring or a compression spring arrangement, or a resiliently compressible body, such as an elastomeric washer. One benefit of the spring washer is that the clamping pressure exerted against the blade can be offset radially outboard for rotational stability of the blade, while accommodating a suitably small shoulder diameter on the arbor. Alternatively, a larger diameter shoulder may be provided with the biasing element in direct axial alignment between the engagement face 74 and the enlarged shoulder.

It is contemplated that the biasing element 90 will have an initial undeflected configuration having a free height that exceeds the compliance distance c. For a mechanical biasing element, such as the Belleville spring washer, the difference between the free height and the compliance distance determines the amount of axial force generated by the biasing element, which translates into clamping force applied to the blade 12. In embodiments in which there is no keyed or interlocking interface between the blade and the hub, this clamping force must be sufficient to prevent slipping of the blade as it is rotated by the arbor at operational speeds. In addition, the force generated by the biasing element when it is compressed to the compliance distance c must be sufficient to prevent axial shifting of the blade during use.

In the illustrated embodiment, the fastener 80 is a threaded bolt. However, other types of fasteners are contemplated provided that sufficient clamping force can be exerted between the outside washer 71 and the arbor shoulder 20. Thus, the fastener may incorporate a non-threaded engagement between the fastener and the bore 19 in the arbor, such as a press-fit, bayonet mount, quick-release connection and the like. Alternatively, the spindle itself may incorporate a fastener element that extends beyond the outside washer 71, such as a threaded post, and the fastener 80 may be in the form of a threaded nut to engage the post.

The blade mounting assembly 70 may be used to easily and quickly mount the cutting blade 12 to the arbor 16. The blade may be first mounted on the hub 72 of the outer washer 71, followed by the biasing element 90.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A blade mounting assembly for mounting a rotary blade to an arbor, the arbor defining a shoulder and a spindle, and the rotary blade defining a bore therethrough and having a right side face facing the shoulder and a left side face facing away from the shoulder, the bore having a perimeter wall that defines a perimeter shape with a keyed portion, said mounting assembly comprising:

an outer washer including;

an elongated hub configured to extend through the bore of the rotary blade, said hub defining a central bore sized to receive the spindle of the arbor extending therethrough and a locating surface arranged to contact the shoulder when the spindle extends through said central bore, said elongated hub having an outer surface that forms a perimeter shape that is shaped complementary to the perimeter shape of the bore of the rotary blade, the outer surface of the hub including a keyed portion that is configured to interlock with the keyed portion of the bore of the rotary blade when the hub is extended through the bore so that the rotary blade is rotated together with the outer washer by the arbor; and an engagement surface arranged to contact the left side face of the blade when the hub extends through the bore of the rotary blade;

a fastener configured for fastening said outer washer to the arbor with said locating surface in contact with the shoulder; and a biasing element configured to be disposed over said hub between the shoulder and the right side face of the blade when said hub extends through the bore of the rotary blade, the biasing element being configured to bias the rotary blade away from the shoulder such that left side face of the rotary blade is positioned in contact with the engagement surface of the outer washer;

wherein the locating surface of the hub of the outer washer is configured to space the engagement surface a fixed axial distance apart from the shoulder when the locating surface is positioned in contact with the shoulder with the spindle extending through the central bore of the hub, wherein the fixed axial distance is greater than a thickness of the rotary blade between the left side face and the right side face such that, when the biasing element biases the left side face of the rotary blade into contact with the engagement surface, the right side face of the rotary blade is spaced apart from the shoulder.

2. The blade mounting assembly of claim 1, wherein said biasing element is a spring washer concentrically mounted over said hub.

3. The blade mounting assembly of claim 2, wherein said spring washer includes an outer foot aligned with said engagement surface when said spring washer is concentrically mounted over said hub.

4. The blade mounting assembly of claim 1, wherein said fastener includes a bolt having a threaded shank configured for engaging a threaded bore in the spindle, and an enlarged head configured to bear against said outer washer when said threaded shank is tightened within the threaded bore.

5. The blade mounting assembly of claim 1, wherein said engagement surface of said outer washer extends radially from said hub.

6. The blade mounting assembly of claim 5, wherein said engagement surface is an annular surface.

7. The blade mounting assembly of claim 6, wherein said biasing element includes a foot at one end contacting the shoulder and a foot at an opposite end contacting the right side face of the blade, said opposite foot being axially aligned with said annular engagement surface when said biasing element is disposed over said central hub.

* * * * *